United States Patent [19]

Wingard et al.

[11] 4,169,203

[45] Sep. 25, 1979

[54] WATER-SOLUBLE POLYMERIC COLORANTS CONTAINING ANIONIC WATER-SOLUBILIZING GROUPS

[75] Inventors: Robert E. Wingard, Palo Alto; Daniel J. Dawson, Menlo Park, both of Calif.

[73] Assignee: Dynapol, Palo Alto, Calif.

[21] Appl. No.: 743,205

[22] Filed: Nov. 18, 1976

[51] Int. Cl.$^2$ .......................... C09B 5/24; C09B 1/32; C09B 31/30; C09B 43/00

[52] U.S. Cl. .................................. 546/76; 260/144; 260/208; 546/167; 260/326 C; 260/369; 260/378; 260/374; 546/100

[58] Field of Search .............. 260/144, 208, 278, 378, 260/369, 704, 272, 326 C, 287 CF, 374; 546/66, 68, 79

[56] References Cited

U.S. PATENT DOCUMENTS

| | | | |
|---|---|---|---|
| 2,005,317 | 6/1935 | Helwert et al. | 260/377 |
| 2,366,034 | 12/1944 | Letang | 260/207 |
| 2,522,034 | 9/1950 | Grossmann et al. | 260/377 X |
| 2,673,198 | 3/1954 | Grandjean et al. | 260/144 |
| 3,278,486 | 10/1966 | Meek et al. | 260/47 |
| 3,340,221 | 9/1967 | Goldberg et al. | 260/41 |
| 3,920,855 | 11/1975 | Dawson et al. | 260/250 |
| 4,000,118 | 12/1976 | Dawson et al. | 260/79.5 C |
| 4,018,826 | 4/1977 | Gless et al. | 260/583 P |
| 4,051,138 | 9/1977 | Wang et al. | 260/278 |

OTHER PUBLICATIONS

Korshak et al., Index Chemicus, vol. 38, #90867, (1968).

*Primary Examiner*—Floyd D. Higel
*Attorney, Agent, or Firm*—William H. Benz

[57] ABSTRACT

Acetylation of residual primary and secondary alkyl amine groups present in the structure of polymeric colorants and the acetylated colorant products are disclosed. The acetylation is a post production step. The acetylation improves the colorants' water solubility.

18 Claims, No Drawings

WATER-SOLUBLE POLYMERIC COLORANTS CONTAINING ANIONIC WATER-SOLUBILIZING GROUPS

REFERENCE TO RELATED APPLICATION

This application is related to U.S. Pat. Application Ser. No. 743,203, filed of even date herewith by Daniel J. Dawson, Guy A. Crosby, and Robert E. Wingard, and entitled "Acetylation of Crude Reaction Products Containing Polymeric Colorants", and now abandoned.

BACKGROUND OF THE INVENTION

1. Field of the Invention

This invention relates to an improvement in polymeric colorants. More particularly it involves polymeric colorants with improved solubility at acidic pH's and a method for their achievement.

2. The Prior Art

U.S. Pat. No. 3,920,855 of Dawson, et al., issued Nov. 18, 1975 and U.S. Pat. No. 4,018,826, issued Apr. 17, 1977 to Gless, et al., disclose that polymeric colorants can offer attractive properties such as inability to be absorbed through the walls of the gastrointestinal tract. This nonabsorption means much reduced and possibly eliminated risks of systemic toxicity and suggests advantageous application of stable polymeric colorants in edibles such as foods, beverages and the like. It is a common characteristic of such applications to have aqueous substrates or to at least contain an aqueous phase, in which the colorant is to be dissolved. These applications also often present acidic environments of use as the majority of food and beverage applications are acidic. Thus, an important property of a polymeric colorant is often its ability to dissolve or remain in solution in an acidic aqueous enviroment.

One way to achieve this desired acid solubility is to incorporate in the polymeric colorant anionic groups such as carboxyl groups, sufonate groups or phosphonate groups.

Now, a polymeric colorant of the type disclosed by Dawson, et al., and Gless, et al., is of two parts—a nonchromophoric often alkyl backbone and a plurality of optical chromophores covalently affixed thereto. These anionic groups can be present either attached to the backbone or as part of the chromophores. In either position they serve to impart water solubility to the final polymeric colorant product.

In the Dawson, et al., and the Gless, et al., disclosures, the chromophore units are covalently bound to the backbone through sulfonamide or amine linkages. In situations where there is very complete substitution of these amine groups by sulfonate groups or by sulfonate-containing chromophores, the character of the overall polymeric colorant is anionic and solubility in acidic aqueous environments is fully adequate. In situations where there is a substantial proportion of unsubstituted primary alkyl amines or dialkyl amines present in the polymeric colorant as can occur either with low degrees of amine substitution by aromatic chromophore units or with substitution by chromophores through an alkyl link, it is seen that the polymeric colorants often haze and precipitate from solution at acidic pH's. In light of the success of the present invention it now appears that at basic to neutral pH's such colorants have a distinctly anionic character imparted by their $COO^-$, $SO_3^-$ or $PO_3^=$ groups and are soluble. It now appears that at acidic pH's the amines begin to become protonated and the polymer approaches an isoelectric state. In view of the present teachings one may explain this precipitation as that at their isoelectric point the polymeric colorants form insoluble intramolecular and cross-linked salts. This isoelectric condition generally occurs at pH's of 2—4 for amine-containing polymeric colorants. This is an unfortunate pH to have precipitation occur as it is the pH of many soft drinks and most fruit-flavored foods—major applications for food colors.

The present invention has eliminated this troublesome precipitation of primary and secondary amine-rich polymeric colorants.

STATEMENT OF THE INVENTION

It has now been found that subjecting a primary or secondary alkyl amine-rich polymeric colorant to acetylation as a post-production treatment eliminates this acid precipitation problem. In one aspect this invention concerns the improvement in the preparation of primary and secondary alkyl amine-containing polymeric colorants which comprises incorporating in the preparation process a post-production acetylation step.

In a second aspect this invention involves the acetylated polymeric colorant products of this post treatment. More particularly these products are polymeric colorants wherein enough residual primary or secondary alkyl amines have been acetylated that the number of anionic groups substantially exceeds the number of groups of unacetylated residual primary or secondary alkyl amine.

DETAILED DESCRIPTION OF THE INVENTION

The present invention may be generally described as the acetylation of certain amine groups present on a polymer colorant. There are two types of amines which are acetylated. These are primary alkyl amines,

wherein C is an alkyl carbon, and secondary alkyl amines,

wherein $C_1$ and $C_2$ are each alkyl carbons. Amines which are not affected by the present acetylation and tertiary amines, of course, and primary or secondary aromatic amines, which may be shown as

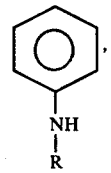

wherein R is hydrogen or an alkyl.

The amines acetylated in the present invention may be present as residual amines pendant from the colorants' nonchromophoric backbone or they may be present in an alkyl group linking the chromophore to the backbone. A typical example which shows both of these two configurations is as follows:

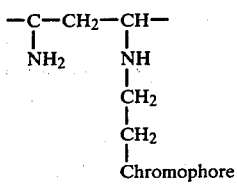

The acetylation of this invention is a "post treatment." That is, it is carried out after the chromophores have been bonded together via the backbone. The acetylation may be carried out in either of two modes. In the first mode, the polymeric colorant as a particulate solid is contacted with acetic anhydride at an elevated temperature such as from 75° C. to 175° C. for from about 5 minutes to about 3 hours. Preferably temperatures of from 90° C. to 150° C. and times of from 10 minutes to 2 hours are employed. In this mode, a substantial excess, usually a 3 to 20 molar excess, of acetic anhydride, based on the moles of acetylatable amine, is employed.

In the second mode, which is preferred generally, a solution of the colorant is contacted with acetic anhydride in liquid phase. This reaction is carried out at low temperatures such as from about 0° C. to about 20° C. Lower temperatures could be used but, in view of the usually aqueous solvent of the solution of colorant, it is often convenient to not go markedly below 0° C. Preferred temperatures are 0° C. to 10° C. As was just noted the solvent for the colorant is usually an aqueous solvent—either water or a mixture of water plus up to about 20% water-miscible organics. Typical organics include glycols such ethylene glycol, propylene glycol, ethylene-glycol ethers, alkanols such as methanol, ethanol, and isopropanol and liquid organic bases such as pyridine, and the like. The amount of acetic anhydride employed usually is from 1 to about 6 and preferably 1.5 to about 4 equivalents of anhydride based on the moles of acetylatable amine. This amount, especially 1.5–3 equivalents, is unexpectedly low. One would expect the water and base present to readily consume (hydrolyze) the anhydride and require higher use levels.

In this second mode, the pH of the solution should be kept in the basic range such as from about pH 7–12, preferably 9–12, during the contacting. This often involves gradually adding base such as an alkali metal hydroxide, for example NaOH or KOH, to the acetylation mixture during contacting. The length of contacting time in this second mode need not be long. Times of from a minute or two to 1 hour are generally employed. Longer times could be used but are not seen to offer any advantage.

This second mode of acetylation can be carried out on a colorant preparation reaction mixture either in crude form or after purification, if desired. The use of this acetylation on crude reaction mixtures is preferred for reasons of process simplicity and is claimed in Patent Application Ser. No. 743,203 of Crosby et al.

Following acetylation, the acetylated colorant is recovered. In the case of the solid/liquid mode this can be effected by rinsing residual anhydride off of the solid colorant such as with an organic and drying the solid. If the liquid mode is used, this recovery may involve neutralizing any excess anhydride and optionally removing the resulting salts such as by dialysis, ion exchange or the like.

Polymeric colorants which are improved by application of the present invention may be characterized as having primary and secondary alkyl amine groups present in their structures. These include colorants having alkyl amines in their backbones as well as colorants wherein secondary alkyl amine links are used to attach chromophores to backbones. Examples of such colorants include poly(vinylamine)-, or poly(N-methyl-, ethyl-, or butyl-vinylamine)-backboned colorants wherein less than about 75% of the amines are substituted with aromatic carbons of chromophores, and poly(isopropenyl)- or poly(butenylamine)-backboned colorants with similar substitutions. Other suitable colorants include those based on copolymeric amines such as copolymers of vinylamine with vinylsulfonate, vinylphosphonate or acrylic or methacrylic acid—or the like, wherein the number of amine groups which do not carry a chromophore is significant (0.5 to say 4 or 5 times the number of sulfonates, phosphonates or carboxyls).

The acetylation of this invention is usually not quantitative. It normally acetylates from about 65% to about 95% of the amines and converts them into amide groups, i.e., primary amines are converted to

groups and secondary amines are converted to

groups.

Two examples of typical acetylated colorant products of this invention include colorants based on poly(vinylamine) or poly(n-alkylvinylamine) which has been sulfonated to introduce anionic sulfamate water solubilizers and colorants based on copolymers of vinylsulfonate with vinylamine or N-alkylvinylamine. Such materials, in acetylated form, can be represented structurally as

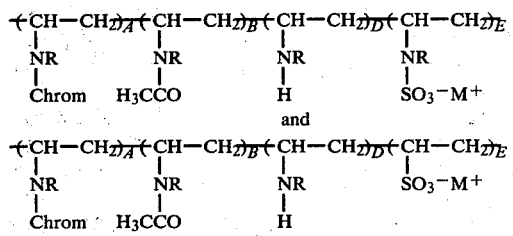

respectively. In these formulae R is hydrogen, methyl or ethyl and preferably is hydrogen, Chrom is an organic optically chromophoric group attached to N via an aromatic carbon and M+ is an ammonium or alkali metal cation, especially Na+ or K+. The relationship of integers A, B, D and E is as follows.
A+B+D+E equals from 100 to 10,000, preferably from 300 to 2000,
and more preferably from 500 to 1500.
A equals from 0.1 to 2.00 times B+D,
preferably 0.1 to 1 times B+D,
and more preferably 0.3 to 0.7 times B+D.
B equals from 2 to 20 times D,
preferably from 3 to 20 times D,
and more preferably 6 to 20 times D.
E equals at least 3 times D
preferably from 3 to 20 times D
and from 0.3 to 1 times A+B+D.
Preferably E equals from 0.3 to 0.7 times A+B+D.

Another typical acetylated colorant is based upon a copolymer of vinylamine and acrylic acid or vinylphosphonate. These materials are represented structurally as

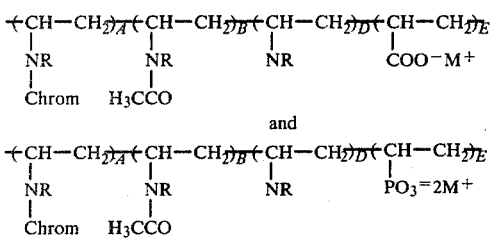

wherein Chrom, R, M+ and A, B, D and E are as defined above.

Further representative acetylated colorants include materials wherein secondary alkyl amines are present in the links affixing chromophores to the backbone. These materials are shown, for example, as

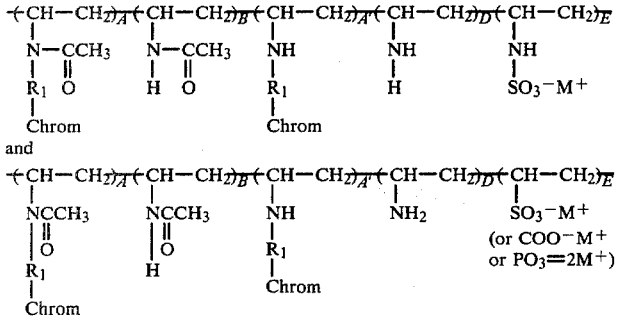

wherein $R_1$ is a 2 to 6 carbon alkyl or substituted alkyl group, especially a 2 to 4 carbon alkyl or substituted alkyl, Chrom and M+ are as defined above and A, A', B, D and E are defined as follows:
A+A'+B+D+E equals from 100 to 10,000 and preferably 300 to 2000.
A+A' equals from 0.1 to 2.0 times B+D.
A equals from 1 to 20 times A'.
B equals 2 to 20 times D,
preferably 3 to 20 times D,
and more preferably 6 to 20 times D.
E equals at least 3 times A'+D and from 0.3 to 1 times A+A'+B+D.

Yet further acetylated colorants can have anionic solubilizer groups such as $SO_3^-$, $COO^-$ or $PO_3^=$ as part of their chromophores and thus do not require additional anionic solubilizers in or on the backbone. These materials are defined structurally as

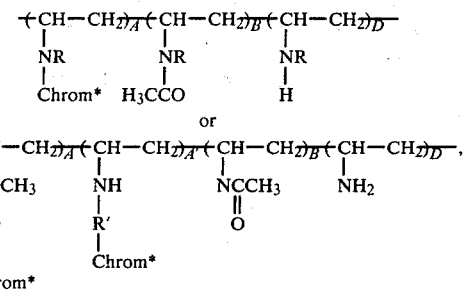

wherein Chrom* is a chromophore having an anionic solubilizer, R and R' are as already defined and A, B and D are related and defined as follows:
A+B+D equals 100 to 10,000,
A equals 0.1 to 3 times B+D and
preferably 0.1 to 2 times B+D.
B equals 2 to 20 times D
and preferably 3 to 20 times D.
A, A', B and D are related and defined as follows:
A+A'+B+D equals 100 to 10,000.
A+A' equals 0.1 to 3 times B+D
and preferably 0.1 to 2 times B+D.
A equals from 2 to 20 times A'
and preferably 3 to 20 times A'.
B equals 2 to 20 times D
and preferably 3 to 20 times D.

The chromophores, denominated Chrom and Chrom* in the above formulae, which are incorporated in the polymeric colorants acetylated in accord with this invention, may be selected from the class of organic groups which present an optical color to the human eye when covalently bound into polymeric form. The precise chromophore used is not considered to be critical to the functioning of the present invention. Chromophores may be selected, for example, from the classes of azo, anthraquinone, triphenylmethane, indigoid, xanthene, and nitroaniline colors and the like. The majority of our development efforts and the following examples have been devoted to azo and anthraquinone colors because of the wide range of intense clear colors they present. This does not imply that the present invention would not be useful with other classes of colors.

Preferred anthraquinone chromophores in their unattached state have a leaving group such as a —Cl, —Br, —I, —$SO_3Na$, —$N_2^+Cl^-$, or —$NO_2$ group attached to their aromatic ring. This permits the chromophore's facile attachment to the backbone via for example amine group by known techniques such as the Ullmann reaction wherein copper is used to catalyze the leaving groups' displacement by amines. In many cases, no catalyst is required to effect the desired displacement. Representative classes of useful anthraquinone chromophores include:

Aminoanthraquinone chromophores of the structure of Formula I;

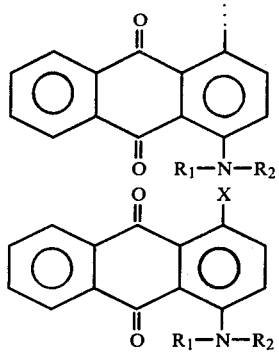

formed by coupling the monomer IA wherein $R_1$ is a hydrogen or a lower saturated alkyl of up to four carbon atoms, $R_2$ is hydrogen, a lower saturated alkyl of up to four carbon atoms or an aryl or alkaryl of from six to eight carbons and X is a leaving group. These are useful to give the range of blue colorants listed in Table I.

TABLE I

| Compound | | |
|---|---|---|
| $R_1$ | $R_2$ | Color |
| hydrogen | hydrogen | purplish blue |
| hydrogen | methyl | greenish blue |
| hydrogen | ethyl, propyl or butyl | greenish blue |
| hydrogen | aryl | navy blue |

Anthrapyridones of the structure of Formula II;

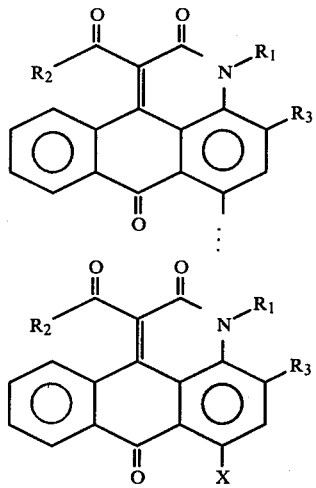

formed by coupling the corresponding monomer, wherein X is a leaving group, $R_1$ is hydrogen, a lower saturated alkyl of from 1 to 4 carbon atoms inclusive, or an aryl grouping of about 6 carbons, $R_2$ is a 1 to 4 carbon lower saturated alkyl, a 1 to 4 carbon lower saturated alkoxy, or an aryl grouping of about 6 carbon atoms, and $R_3$ is hydrogen or a 1 to 4 carbon lower saturated alkyl. These chromophores are rich reds. Preferred among the anthrapyridones are these according to Formula II wherein $R_1$, $R_2$ and $R_3$ are shown by Table II.

TABLE II

| $R_1$ | $R_2$ | $R_3$ |
|---|---|---|
| hydrogen | 1,4 carbon alkyl | 1-4 carbon alkyl |
| hydrogen | methyl | methyl |
| hydrogen | methoxy | 1-4 carbon alkyl |
| hydrogen | methoxy | methyl |
| hydrogen | ethoxy | 1-4 carbon alkyl |
| hydrogen | ethoxy | methyl |
| hydrogen | phenyl | methyl |
| methyl | methyl | hydrogen |
| methyl | phenyl | hydrogen |
| ethyl | methyl | hydrogen |
| methyl | methoxy | hydrogen |
| ethyl | methoxy | hydrogen |

Anthrapyridines of the structure of Formula III:

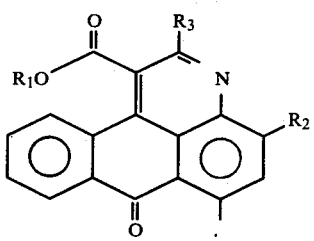

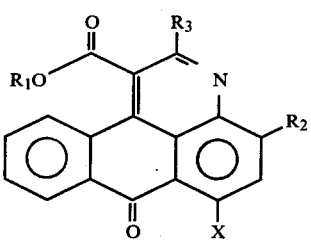

wherein X is a leaving group, $R_1$ is a 1 to 4 carbon lower alkyl group or an aryl group of about 6 carbons and $R_2$ is hydrogen or a 1 to 4 carbon lower alkyl and $R_3$ is a 1 to 4 carbon alkyl group or aryl group of about 6 carbons. These colorants range in hue from yellow to red. Preferably $R_2$ is hydrogen or methyl. Other typical anthraquinone chromophores include the pyridinoanthrones, anthrapyrimidines and anthrapyrimidones.

Other chromophores include azo chromophores, such as those having monomeric forms containing sulfonyl halide groups since they can join to the amine backbone via the well-known Schotten-Baumann reaction. Exemplary azo chromophores and representative halo precursors include:

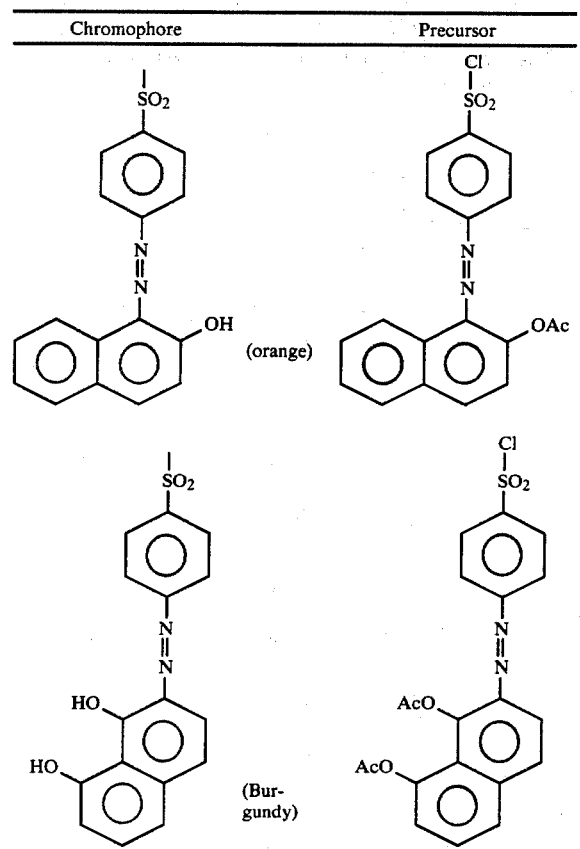

The Schotten-Baumann reaction also functions with sulfonyl halide-containing nonazo chromophores such as:

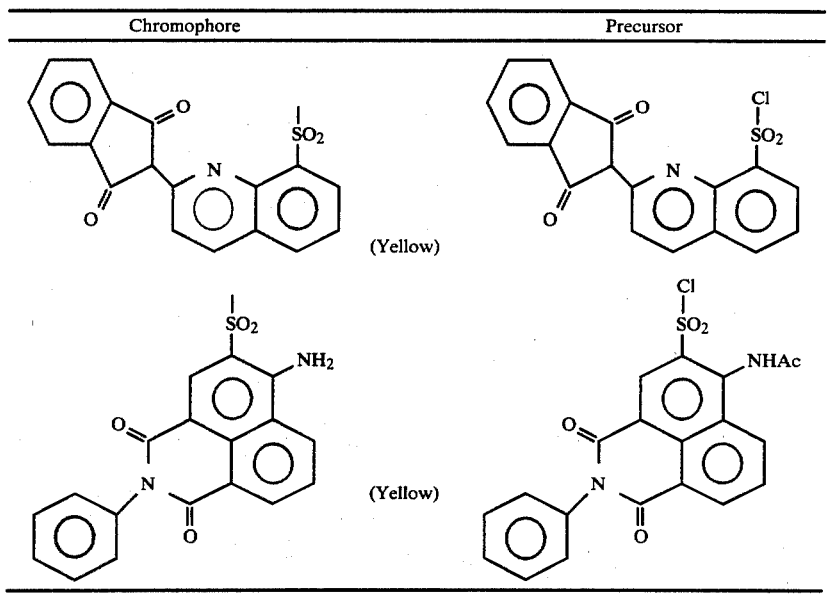

The attachment of these or other chromophores to backbones may be carried out by any of the methods for joining a chromophore to a polymer through an amine link known in the art.

The present acetylation process and its products will be further shown by the following examples. These are to exemplify the present invention and are not to be interpreted as limiting its scope which is instead defined by the appended claims.

EXAMPLE I

This example shows the preparation of a polymeric colorant and its acetylation in accord with this invention.

A. Preparation of Copolymer Backbone

To 2304 g of acetamide (technical) in a 12-liter reaction flask is added 62.2 ml of 6 M aqueous sulfuric acid followed immediately by 661 g of acetaldehyde (99+%). This mixture is stirred and heated until the internal temperature reaches 78° C. (11 minutes) at which point the clear solution spontaneously crystallizes, causing a temperature rise to 95° C. The reaction product, ethylidene-bis-acetamide, is not separated. Heating and stirring are continued for another 5 minutes to a temperature of 107° C. and a mixture of 150 g calcium carbonate (precipitated chalk) and 150 g of Celite ® diatomaceous earth powder is added. A first distillate fraction of water and acetamide is removed. The remaining materials are cracked at 35 mm Hg and 185° C. A fraction made up of vinylacetamide and acetamide is taken overhead, analyzed by NMR and found to contain 720 g of vinylacetamide. A portion of this pooled material is dissolved in isopropanol, cooled, and filtered to yield a stock solution. This stock solution is analyzed and found to be 4.1 molar in vinylacetamide.

Into a five-liter flask is added 505 ml (272 g) of a vinylacetamide solution obtained by stripping isopropanol from 900 ml of the above stock solution (containing 3.69 mole of vinylacetamide). AIBN (15 g) in 1500 ml of water is added followed by 1279 g of 25% weight sodium vinyl sulfonate in water (Research Organic Corp.) and one liter of water. This is 2 equivalents of sulfonate per 3 equivalents of vinylacetamide. Following deoxygenation, the mixture is heated to 65° C. and there maintained with stirring for 3 hours. This reaction mixture is then reduced to ⅔ volume. Solid AIBN is removed and the liquid added to 8 gallons of isopropanol. The copolymer precipitate is collected and dried in vacuum to yield 865 g of solid copolymer (molecular weight $6.6 \times 10^4$). Whenever an experimental molecular weight is given in this specification, it is derived by gel permeation techniques. In the primary technique, a silanized porous glass support is used with 0.01 M LiBr in DMF eluant. Detection is by refractometer with standardization being based on suitable purchased poly(styrene) or poly(styrenesulfonate) standards.

Into a two liter flask is added 863 g of the just-noted solid product, 2.5 liters of water and one liter of concentrated hydrochloric acid. The mixture is refluxed (99°–110° C.) for about 24 hours, and cooled. The solid precipitate is washed, and dissolved in 3 liters of 10% NaOH. This reaction mixture is added to about twelve liters of methanol to give 400 g of fine solid precipitate.

B. Preparation of Chromophore

Into a 5-liter kettle is charged 750 g of 1-amino-2-methyl-4-bromo-anthraquinone (Sandoz AMBAX), 1550 g of ethylacetoacetate, 580 g of nitrobenzene, and 19.6 g of sodium acetate. The mixture is deoxygenated and heated to 150° C. over about 4 hr. During the last 2.5 hr, 385 ml of distillate is collected. The product is cooled, collected on a filter and washed with acetone and water and dried to yield 830 g of the chromophore

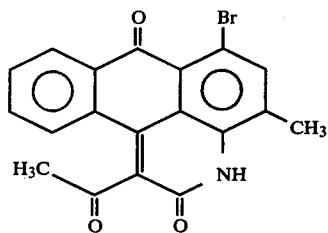

C. Attachment of Chromophore

300 Grams of the copolymer of Part A is dissolved in 4.2 liters of 1 N NaOH, and the mixture is heated to 90° C. Then 480 g of the chromophore of Part B and 20 g of $Cu_2Cl_2$ catalyst are added. The mixture is heated at 90°–101° C. for 3.5 hr, while an additional 4 liters of NaOH and an additional 20 g of catalyst are added. The mixture is cooled by adding 10.7 kg of ice and the pH is brought to pH 10.

D. Acetylation and Recovery

Four one-liter portions of the mixture of Part C are taken. The first three (1, 2 and 3) are treated with an acid ion exchange column to remove copper catalyst. These three mixtures are then individually charged to an Amicon laboratory scale ultrafiltration unit which employs an Amicon PM-10 membrane (10,000 molecular weight nominal cut off). Low molecular weight impurities are taken off as ultrafiltrate. During the initial stages of these ultrafiltrations about 10% pyridine and base are added to the mixtures to aid ultrafiltration. In the latter stages they, too, are removed. This leaves three solutions of about pH 7 purified polymeric colorant. Two of these solutions are lyophilized to give a powdered dye of the formula:

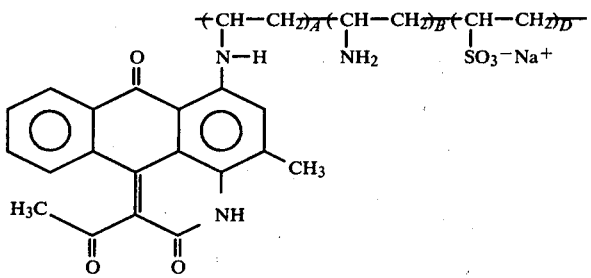

Wherein
A+B+D equals about 1000
A+B=1.5–2 D
B=2.5–3 A

One of these dried samples (#2) is slurried in acetic anhydride (20 equivalents based on the amount of residual amine (B) in the dye) and heated at 125° C. for about 2 hours. The solid is recovered by filtration, rinsed with dilute ether and dried at 55° C. in a vacuum oven. The third (undried) sample, of ultrafiltered solution is cooled to 0° C. in an icebath. Five equivalents of acetic anhydride (basis amine B) is gradually added with stirring along with 50% NaOH in an amount to maintain the pH between 10 and 12. After about 10 minutes the solution is brought to about pH 10 with HCl and is charged to the ultrafiltration unit to remove salts of neutralization. This solution is recovered and lyophilized. The fourth portion of crude reaction mixture is directly acetylated. Three equivalents of acetic anhydride (basis amines B) and 50% NaOH are added to the solution at 0°–5° C. with stirring to maintain the pH at 10–12. After the anhydride is completely added, the crude material plus added pyridine is charged to an Amicon ultra-filtration unit and purified as described above. The purified retentate is ion exchanged, neutralized and lyophilized.

The products of samples 2, 3 and 4 are essentially the same. They differ from the product of sample 1 in that 85–95% of the residual amines (B) have been converted to the amide form

Five-hundred ppm solutions in pH 7 distilled water are prepared from each of the four dried products. All are excellent red-colored solutions. Hydrochloric acid is added very slowly with stirring. As the solution pHs drop below 5, it is noted that the solution of material 1, the unacetylated material, begins to show some haziness. If this solution were allowed to stand a portion of its dye would gradually gel and precipitate. The three remaining materials (which have been acetylated in accord with this invention) show no tendency to precipitate at this or even lower pH's.

EXAMPLE II

A. Formation of a homopolymeric polyaminoethylene backbone is carried out. A red-brown solution of 460 g of vinylacetamide, 557 g acetamide, and ethylidene-bis-acetamide, (one-half of five combined vinylacetamide preparations essentially in accord with Example I) in 570 ml methanol is filtered through 250 g of Amberlite ® IRC-50 ion exchange resin over an eignt hour period. The column is rinsed with 1000 ml methanol. The combined column eluent is stripped to its original volume of 1,667 ml, treated with 7.75 g of AIBN polymerization catalyst (1 mole %), deoxygenated, and stirred under argon at 65° C. for 15 hours to polymerize. Solid polymer is precipitated from the resulting very thick solution by addition to 15 liters of acetone. The polymer is collected by filtration, washed with acetone and dried in a vacuum over (80° C.) for two days to afford 459 g of crude poly(vinylacetamide) contaminated with acetamide as a yellow, semigranular solid having molecular weight of $2 \times 10^5$ as determined by Gel Permeation Chromatography, using dimethylformamide as eluent and polystyrene as standards.

The crude poly(vinylacetamide) (459 g) is dissolved in 1000 ml water with heating. Concentrated hydrochloric acid (1000 ml) is added and the resulting dark brown solution is stirred and heated at a gentle reflux (97°–106° C.) for 19 hours. A precipitate forms and is redissolved by addition of 200 ml water. Reflux is continued and over the next eight hours 1000 ml water is added in several portions to maintain solubility of the polymer. After a total of 27 hours at reflux, the polymer is precipitated by the addition of 1000 ml concentrated hydrochloric acid. The mixture is cooled to 18° C. and the thick polymeric gum isolated by decantation and dried under vacuum at 50°–75° C. with occasional pulverization for 40 hours to give 332 g of poly(vinylamine hydrochloride) as a brown granular solid (77% yield from vinylacetamide, 59% from acetaldehyde).

-continued

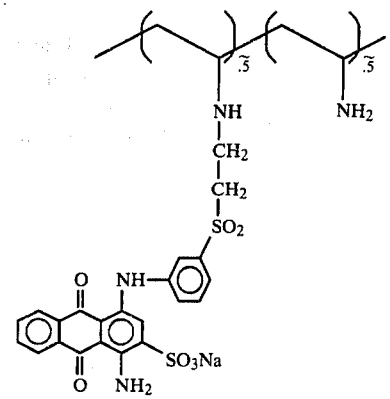

A 500 ml flask is fitted with a stirrer, pH probe, a dropping funnel and an argon purge. The polymer is dissolved in 50 ml of water and 5 ml of 2.5 n NaOH (ph 12.0). This is added to the flask which already contains 200 ml of water and the reactive blue. The mixture is stirred and heated to 60° C. while base is added to hold the pH above 10. The solution is heated to 110° C. for three hours, cooled, and brought to pH 7 with 10% HCl. The neutralized solution is dialyzed with $H_2O$ to remove monomers and salt. After filtration and evaporation to 500 ml, it is lyophilized to yield 4.4 g of product.

This product dissolves in water. However, at acidic pH's it shows a tendency to haze and precipitate.

C. A 1.00 g portion of the polymeric colorant is suspended in 100 ml of water. The pH is brought to 10 with 10% NaOH. It is evaporated to 20 ml. With the pH at 10, the solution is cooled to 0° C. and 5.4 g of acetic anhydride is added. Base (2.5 N NaOH) is slowly added while stirring the mixture. The pH remains above 7 as 35 ml of base is added. Then the mixture is stirred at 0° C. for 15 minutes and at room temperature for an hour. The mixture is dialyzed and lyophilized. This yields as a solid, the acetylated product

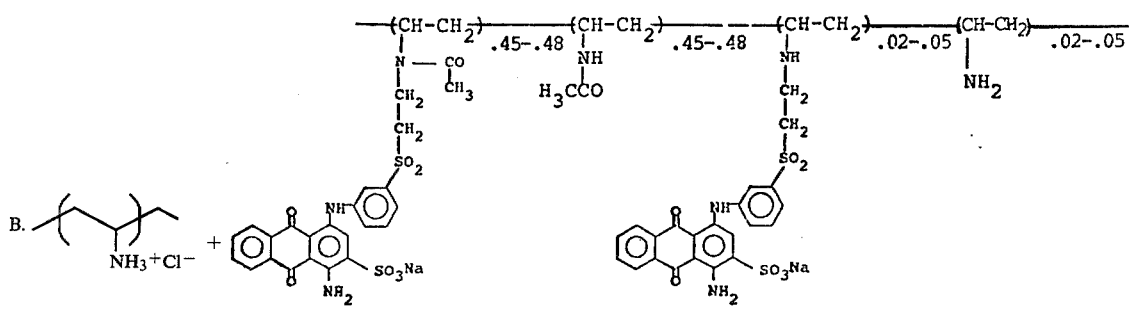

This acetylated product is compared with its unacetylated precursor. It can be seen that the acetylated product is markedly more soluble at pH 7 and below. The unacetylated material shows a tendency to be hazy in acid. The acetylated material does not.

D. This experiment is repeated using a 10,000 MW polyaminoethylene prepared essentially in accord with part A of this Example. Acetylation is observed to yield the same improvement with this material.

EXAMPLE III

A. Preparation of Poly(N-ethylvinylamine)

117 g (1 mole) of ethylaminoethanol is treated with 225 g (2.2 mole) of Ac₂O at 100° for four hours. The bis-acetate is obtained by vacuum distillation. The bis-acetate product is pyrolyzed by passing 100.5 g (0.5 mole) of this material at a rate of 1.25 g/min through a Pyrex® helices-packed quartz tube (3.5 cm×40 cm) maintained at 495°. A 400 ml/min Ar stream is employed. The crude pyrolysate is distilled (96°/20 mm) to afford N-ethylvinylacetamide.

The purified N-ethylvinylacetamide (25 g) is polymerized in 60 ml of MeOH at reflux in the presence of 4 mole % AIBN. The polymerization is complete within 18 hours and afford poly(N-ethylvinylacetamide). The product is isolated by precipitation from ether and the molecular weight is determined to be greater than 10,000.

The polymeric amide is hydrolyzed with 10 parts by weight of 6 N HCl at 125°. The yield of poly(N-ethylvinylamine) as the hydrochloride salt is quantitative. The product is isolated by precipitation of the partially evaporated reaction mixture from isopropanol.

B. Preparation of Chromophore

1. 3'-Carbethoxy-2-methyl-4-anilinoanthrapyridone 4.12 g (10 mmole) of 3'-carbethoxy-2-methyl-4-bromoanthrapyridone (purchased from Sandoz Colors and Chemicals) is stirred under an inert atmosphere with 25 ml of aniline in a bath maintained at 145°-150°. After 2.5 hours, TLC (EtOAc on silica gel) indicates the complete disappearance of starting material with the formation of a sole product. Removal of the excess aniline by vacuum distillation followed by drying in vacuo (100°/0.1 mm) affords a quantitative yield of product (4.24 g).

2. Chlorosulfonation 4.00 g (9.43 mmole) of 3'-carbethoxy-2-methyl-4-anilino-anthrapyridone is dispersed in 25 ml of CHCl₃ and the mixture is cooled to 0°. To the mixture is added dropwise over a period of one hour five equivalents (4.10 g) of chlorosulfonic acid. After stirring at 0° for an additional one hour, the reaction mixture is filtered and the product is washed well with CHCl₃ (0°) and then dried in vacuo to afford 4.66 g (8.91 mmoles) of sulfonyl chloride as a violet-red crystalline solid. Elemental analysis confirms the following structure:

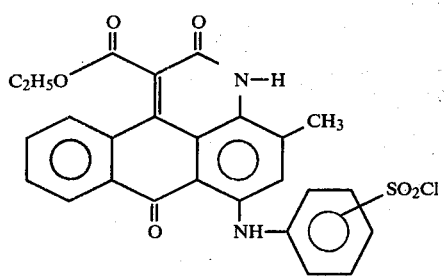

C. Coupling 1.0 mmole of the above sulfonyl chloride is treated with 3.0 mmoles of poly(N-ethylvinylamine) with 40 ml of THF-H₂O (1:3) at room temperature and pH 10.5-11.0. This affords a red polymeric dye with poor water solubility of the following structure:

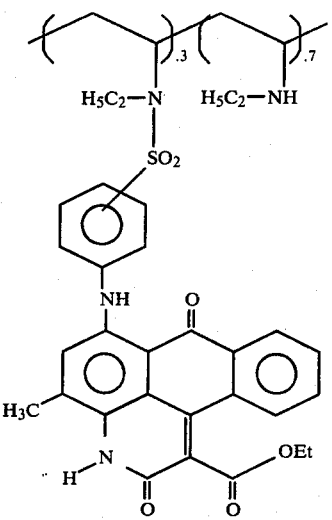

D. Solubilization

The crude dye solution was treated with trimethylaminesulfur trioxide at room temperature and pH 10.5-11.0 for two hours. The mixture is then brought to pH 7, filtered, dialyzed and lyophilized to afford a bluish red polymeric colorant with the following structure:

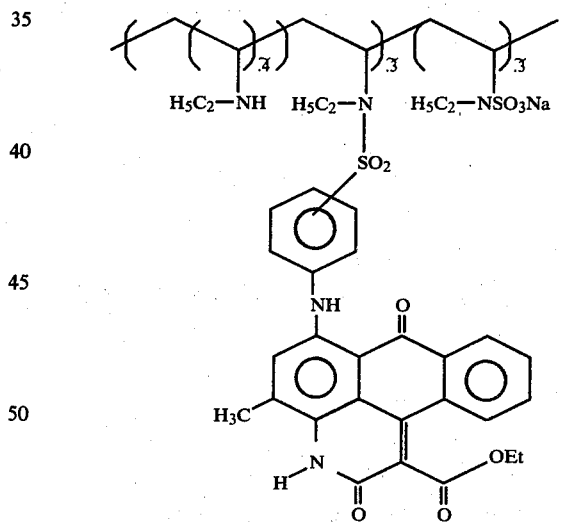

The solubilized dye material shows improved water solubility but has a tendency to come out of acidic solutions.

E. Acetylation

A portion of the purified dye material is dissolved in pH 10 water. The solution is cooled to 0° C. and five equivalents, basis acetylatable amine, of acetic anhydride is added. Base is added to hold the pH at about 9-10 for 15 minutes. Then the temperature is raised to room temperature for about an hour. The product is recovered in purified form by dialysis and lyophilization. It has the formula:

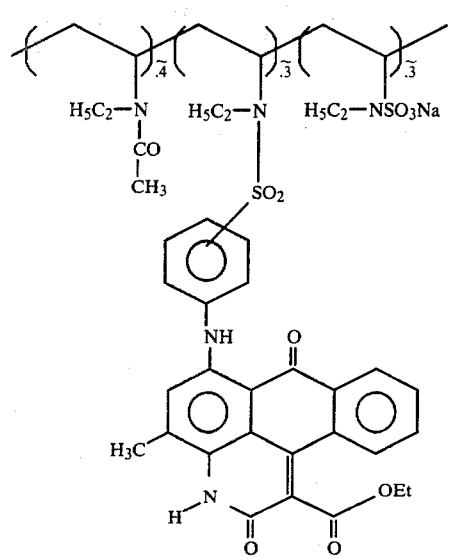

This acetylated material has the same color properties as the unacetylated material. It has, however, better solubility properties in acid solution—showing less tendency to precipitate and no tendency to form haze.

EXAMPLE IV

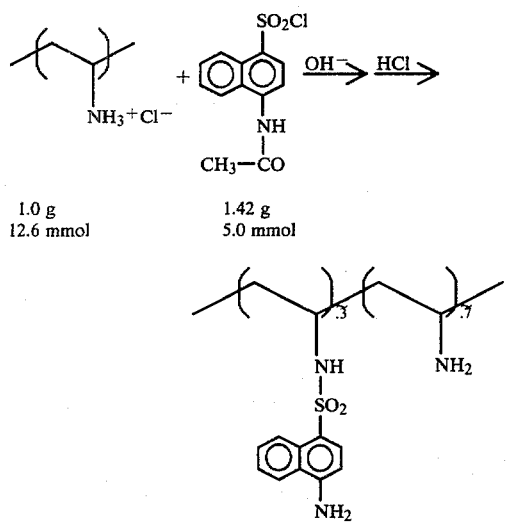

In a 500 ml flask, the polymer of Example II, Part A, is dissolved in 50 ml of water and 5 ml of 2.5 n NaOH (pH 12). The 4-acetamido-1-naphthalene-sulfonyl chloride is gradually added and the mixture is stirred for an hour. The solution is filtered and dripped into 25% acetic acid to give a precipitate which is collected, rinsed and dried.

The powder is suspended in excess 10% hydrochloric acid and heated at reflux for an hour to yield the desired amine product.

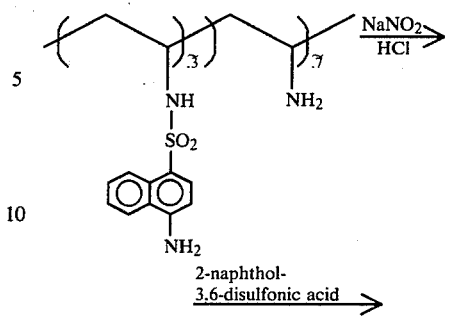

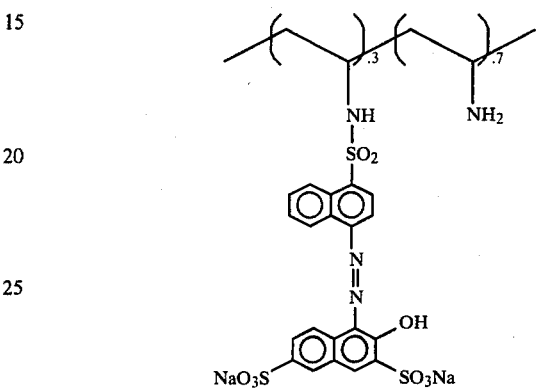

The polymer of Part A (5 mmole) is dissolved in 150 ml of 2% hydrochloric acid with stirring. Aqueous NaNO$_2$ solution (5 ml of 1.0 N) is added. This mixture is then dripped into a solution containing 1.5 g of the napthol sulfonic acid in 75 ml of 6% aqueous sodium hydroxide which is chilled to 0° C. When the addition is complete, the mixture is stirred at 0° C. for 30 minutes and brought to pH 1 with 10% hydrochloric acid. A red orange precipitate forms which is the desired polymeric colorant. It is recovered.

C. The product of Part B (0.1 g) is dissolved in 4 ml of pH 12 water. After cooling to 0° C., three equivalents of acetic anhydride, basis amine, are added and the mixture is stirred at pH 9–12 for 30 minutes. The mixture is warmed to room temperature and dialyzed. The retentate is lyophilized to yield the acetylated colorant.

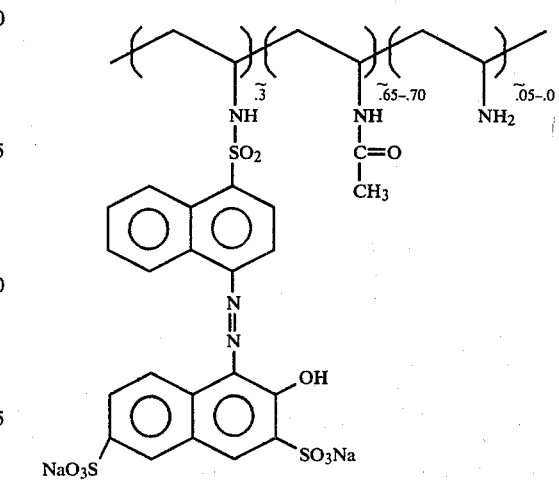

When the solubility and hazing properties of this colorant are compared with the properties of the unacetylated version, it would be observed that the acetylated material showed a much reduced tendency to precipitate or haze in acid aqueous environments.

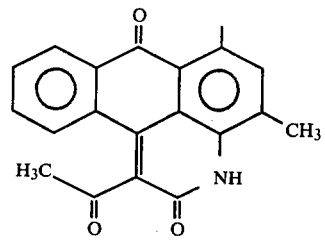

What is claimed is:

1. A water-soluble polymeric colorant containing anionic water-solubilizing groups selected from the group consisting of sulfonate groups, carboxylate groups, sulfamate groups and phosphonate groups; and comprising a nonchromophoric organic polymer backbone to which is covalently bonded a plurality of units of organic chromophore and a plurality of residual primary or secondary alkyl nitrogens, the number of said residual primary or secondary alkyl nitrogens present in an acetylated form as amides being at least twice the number of said residual primary or secondary alkyl nitrogens present as unacetylated amines and the number of anionic water-solubilizing groups being at least three times the number of said residual primary or secondary alkyl nitrogens present as unacetylated amines.

2. The water-soluble polymeric colorant of claim 1, wherein the anionic water-solubilizing groups are sulfonate groups.

3. A water-soluble polymeric colorant of the formula

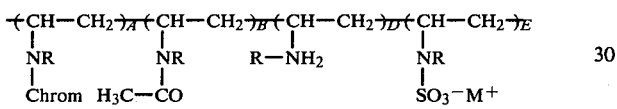

Wherein R is hydrogen, or a lower alkyl, Chrom is an organic optically chromophoric group attached via an aromatic carbon atom in its structure directly to NR, $M^+$ is an ammonium or alkali metal cation, A equals from 0.1 to 2.0 times B+D,
B equals from 2 to 20 times D, and
E equals at least 3 times D, and from 0.3 to about 1 times A+B+D and
the sum of A+B+D+E is a number from 100 to 10,000.

4. The polymeric colorant of claim 3 wherein R is hydrogen.

5. The polymeric colorant of claim 4 wherein Chrom is an anthrapyridone optical chromophore of the structure

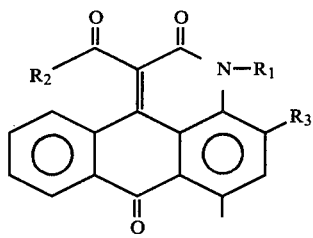

wherein $R_1$ is selected from among hydrogen, a 1 to 4 carbon alkyl and a 6 carbon aryl, $R_2$ is selected from among a 6 carbon aryl and 1 to 4 carbon alkyls and alkoxies and $R_3$ is selected from among hydrogen and 1 to 4 carbon alkyls.

6. The polymeric colorant of claim 5 wherein
A+B+D+E equals from 300 to 2000
A equals from 0.1 to 1 times B+D
B equals from 3 to 20 times D.

7. The polymeric colorant of claim 6 wherein
A+B+D+E equals from about 500 to about 1500
A equals from about 0.3 to 0.7 times B+D
B equals from about 6 to about 200 times D, and
E equals about 0.4 to 0.6 times A+B+D 8. The polymeric colorant of claim 7 wherein Chrom has the structure

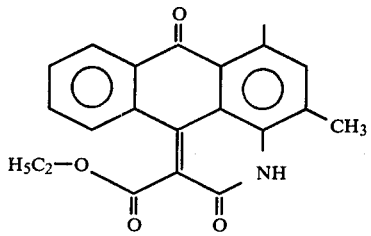

9. The polymeric colorant of claim 7 wherein Chrom has the structure

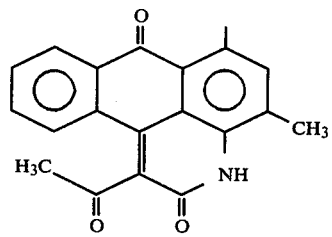

10. A water-soluble polymeric colorant of the formula

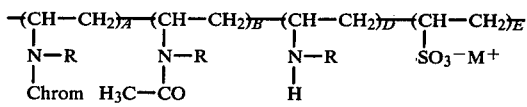

wherein Chrom is an organic optically chromophoric group attached to NR via an aromatic carbon atom present in Chrom's covalent structure, R is hydrogen, methyl or ethyl, $M^+$ is an ammonium ion or an alkali metal cation and
A+B+D+E equals from 100 to 10,000
A equals from 0.1 to 20 times B+D,
B equals from 2 to 20 times D, and
E equals at least 3 times D and from 0.3 to about 1 times A+B+D.

11. The polymeric colorant of claim 10 wherein Chrom is an anthraquinone optical chromophore.

12. The polymeric colorant of claim 11 wherein
A+B+D+E equals from 300 to 2000
A equals from 0.1 to 1 times B+D
B equals from 3 to 20 times D.

13. The polymeric colorant of claim 12
A+B+C+D equals from about 500 to about 1500
A equals from about 0.3 to 0.7 times B+D
B equals from about 6 to about 200 times D, and
E equals about 0.4 to 0.6 times A+B+D.

14. The polymeric colorant of claim 13 wherein R is hydrogen.

15. The polymeric colorant of claim 14 wherein Chrom has the structure

16. The polymeric colorant of claim 14 wherein Chrom has the structure

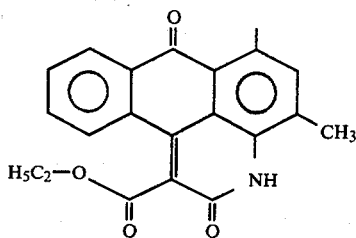

17. A water soluble polymeric colorant of a formula selected from:

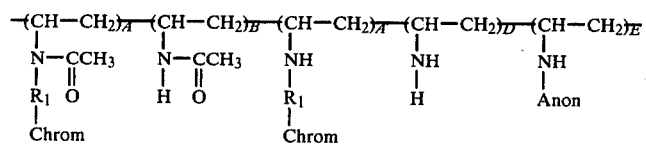

and

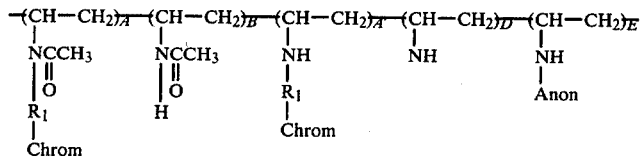

wherein $R_1$ is a 2 to 6 carbon alkyl or alkyl sulfonate group, Chrom is an optically chromophoric group covalently bonded to $R_1$ through an aromatic carbon, Anon is an anionic solubilizer group selected from among

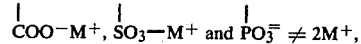

wherein $M^+$ is ammonium or an alkali metal cation, and A, A', B, D and E are numbers defined as follows:
A+A'+B+D+E equals from 100 to 10,000,
A+A' equals from 0.1 to 2.0 times B+D,
A equals from 1 to 20 times A',
B equals from 2 to 20 times D,
E equals at least 3 times A'+D, and from 0.3 to 1 times A+A'+B+D.

18. The polymeric colorant of claim 17 wherein $R_1$ is a propyl sulfonate.

* * * * *